No. 630,101. Patented Aug. 1, 1899.
J. W. PARKIN.
BALL BEARING PULLEY.
(Application filed Oct. 15, 1897.)
(No Model.)
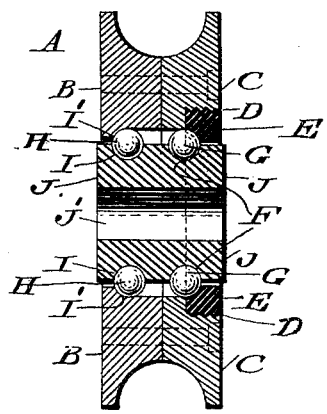

UNITED STATES PATENT OFFICE.

JOSEPH W. PARKIN, OF PHILADELPHIA, PENNSYLVANIA.

BALL-BEARING PULLEY.

SPECIFICATION forming part of Letters Patent No. 630,101, dated August 1, 1899.

Application filed October 15, 1897. Serial No. 655,313. (No model.)

*To all whom it may concern:*

Be it known that I, JOSEPH W. PARKIN, a citizen of the United States, residing in the city and county of Philadelphia, State of Pennsylvania, have invented a new and useful Improvement in Ball-Bearing Pulleys, which improvement is fully set forth in the following specification and accompanying drawing.

My invention relates to ball-bearing pulleys of that class in which is employed a removable ring for retaining the balls in position; and it consists of the novel details of construction, as will be more fully hereinafter set forth, and particularly pointed out in the claims.

The drawing represents a sectional view of my improvement.

Similar letters of reference indicate corresponding parts in the figure.

Referring to the drawing, A designates the ball-bearing pulley, the same comprising the body portion consisting of the sections B and C, the section C being provided with a recess D, in which is seated the ring E, having its outer surface or periphery screw-threaded to engage corresponding threads in the annular wall of the recess and between which ring and an adjacent groove F in the bushing or core J is held the balls or spheres G, which balls or spheres are held in a contiguous groove in the bushing or core, while the balls or spheres H are held in a groove I in the bushing or core J and an alining groove I' in section B. These alining grooves form channels or runways for the balls. The bushing or core J is provided with the bore or opening J'.

Having thus described my invention, what I claim as new, and desire to secure by Letters Patent, is—

1. In a ball-bearing pulley, the combination of a bushing having peripheral grooves, a body in sections, one section formed with recess in its outer face and a channel in the internal face of the body portion opposite the grooves in the bushing, a ring separate from the body-sections and having threaded engagement with the recess in the outer face of one of the body-sections, with its inner face forming a portion of the channel, and balls working in said grooves and channel.

2. A ball-bearing pulley consisting of a bushing having peripheral grooves, a body made in sections with a channel in its internal face, a ring separate from the sections of the body and engaging one of the body-sections with its inner wall constituting a portion of the wall of the channel, and balls interposed between the body and the bushing.

JOSEPH W. PARKIN.

Witnesses:
JOHN A. WIEDERSHEIM,
WM. C. WIEDERSHEIM.